(12) United States Patent
Tsuyuki et al.

(10) Patent No.: US 10,570,850 B2
(45) Date of Patent: Feb. 25, 2020

(54) CONTROL METHOD AND CONTROL DEVICE OF DIRECT-INJECTION INTERNAL COMBUSTION ENGINE

(71) Applicant: NISSAN MOTOR CO., LTD., Yokohama-shi, Kanagawa (JP)

(72) Inventors: Takeshi Tsuyuki, Kanagawa (JP); Takao Inoue, Kanagawa (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 0 days.

(21) Appl. No.: 16/069,007

(22) PCT Filed: Jan. 14, 2016

(86) PCT No.: PCT/JP2016/051015
§ 371 (c)(1),
(2) Date: Jul. 10, 2018

(87) PCT Pub. No.: WO2017/122328
PCT Pub. Date: Jul. 20, 2017

(65) Prior Publication Data
US 2019/0032592 A1    Jan. 31, 2019

(51) Int. Cl.
*F02D 41/40* (2006.01)
*F02D 41/00* (2006.01)
(Continued)

(52) U.S. Cl.
CPC ........... *F02D 41/402* (2013.01); *F01M 13/00* (2013.01); *F02D 41/0042* (2013.01);
(Continued)

(58) Field of Classification Search
CPC ........ F02D 41/40; F02D 41/402; F02D 41/00; F02D 41/0042
(Continued)

(56) References Cited

U.S. PATENT DOCUMENTS 4,711,200 A * 12/1987 Kinoshita ........... F02D 41/1486
123/487
4,875,443 A * 10/1989 Sano ..................... F02D 41/061
123/179.3
(Continued)

FOREIGN PATENT DOCUMENTS

JP      10-103142 A    4/1998
JP      2001-323834 A  11/2001
(Continued)

*Primary Examiner* — John Kwon
*Assistant Examiner* — Johnny H Hoang
(74) *Attorney, Agent, or Firm* — Foley & Lardner LLP

(57) ABSTRACT

A direct-injection internal combustion engine is controlled such that an injection count of multiple-stage injection is switched according to an operating region, and the multiple-stage injection is performed. The multiple-stage injection divides fuel into multiple times in one combustion cycle, and injects the fuel. Fuel vapor generated in a fuel tank as evaporated fuel is supplied to the internal combustion engine. An operating region in which the injection count of the multiple-stage injection is large is controlled to be narrower when an amount of the evaporated fuel supplied to the internal combustion engine is large, compared with a case of the amount of the evaporated fuel being not large.

4 Claims, 10 Drawing Sheets

(51) Int. Cl.
*F02M 25/08* (2006.01)
*F01M 13/00* (2006.01)
*F02D 41/24* (2006.01)
*F02D 41/38* (2006.01)

(52) U.S. Cl.
CPC ............. *F02D 41/40* (2013.01); *F02M 25/08* (2013.01); *F02D 41/2422* (2013.01); *F02D 2041/389* (2013.01); *F02D 2200/021* (2013.01); *Y02T 10/44* (2013.01)

(58) Field of Classification Search
USPC .......... 123/295–300, 305, 435; 701/101–105
See application file for complete search history.

(56) References Cited

U.S. PATENT DOCUMENTS

| | | | |
|---|---|---|---|
| 9,291,108 B2 | 3/2016 | Kurashima | |
| 2006/0207562 A1* | 9/2006 | Miyazaki | F02D 35/027 123/431 |
| 2006/0243243 A1 | 11/2006 | Fukasawa | |
| 2009/0070007 A1* | 3/2009 | Natsui | F02B 23/101 701/103 |
| 2010/0017100 A1* | 1/2010 | Yamamoto | F02D 41/2438 701/104 |
| 2010/0312453 A1* | 12/2010 | Smither | F02D 41/0027 701/103 |
| 2011/0073067 A1* | 3/2011 | Koch | F02D 41/064 123/295 |
| 2011/0307164 A1* | 12/2011 | Arihara | F02D 35/026 701/105 |
| 2013/0151119 A1 | 6/2013 | Mariucci | |
| 2013/0333674 A1* | 12/2013 | Brinkmann | F02B 33/00 123/563 |
| 2015/0252736 A1 | 9/2015 | Kurashima | |
| 2015/0369152 A1* | 12/2015 | Nakagawa | F02D 41/0085 123/445 |
| 2016/0153390 A1* | 6/2016 | Ranga | F02D 41/402 701/104 |
| 2018/0306134 A1* | 10/2018 | Uhrich | F02D 41/0087 |

FOREIGN PATENT DOCUMENTS

| | | |
|---|---|---|
| JP | 2002-115593 A | 4/2002 |
| JP | 2002-295296 A | 10/2002 |
| JP | 2010-133351 A | 6/2010 |
| JP | 4491387 B2 | 6/2010 |
| JP | 2011-64093 A | 3/2011 |
| JP | 2014-173464 A | 9/2014 |
| JP | 2014-202178 A | 10/2014 |
| WO | WO 2015/162797 A1 | 10/2015 |

* cited by examiner

CONTROL METHOD AND CONTROL DEVICE OF DIRECT-INJECTION INTERNAL COMBUSTION ENGINE

TECHNICAL FIELD

The present invention relates to a fuel injection control of a direct-injection internal combustion engine.

BACKGROUND ART

An internal combustion engine system includes a canister to suction vaporized fuel generated in a fuel tank. The vaporized fuel suctioned to the canister is left from the canister by an intake negative pressure developing in an intake passage during an operation of the internal combustion engine and is supplied to the internal combustion engine together with the intake air for combustion treatment (hereinafter this process is referred to as a purge process).

When the vaporized fuel left from the canister is suctioned to the internal combustion engine, an air-fuel ratio is enriched by the amount. In view of this, for example, to reduce deterioration of emission, an amount of fuel injection needs to be corrected so as to be reduced according to the amount of supplied vaporized fuel in the purge process (hereinafter also referred to as an amount of purge).

When the fuel is injected divided into multiple times in one combustion cycle, so-called multiple-stage injection, performing the amount reduction correction possibly makes an injection pulse width in one time smaller than a pulse width at the minimum (hereinafter also referred to as a minimum pulse width) at which stable fuel injection is possible. In consideration of this point, JP4491387B discloses restricting the amount of purge such that all injection pulse widths in the multiple-stage injection do not fall below the minimum pulse width.

SUMMARY OF INVENTION

However, restricting the amount of purge as the above-described Literature fails to sufficiently process the vaporized fuel suctioned to the canister, possibly resulting in the vaporized fuel discharged to the atmosphere.

An object of the present invention is to make it possible to perform fuel injection stably without restricting the amount of purge as described in the Literature.

According to one aspect of the present invention, a control method of a direct-injection internal combustion engine is provided, in which a multiple-stage injection and a single-stage injection are switched and performed according to an operating region, the multiple-stage injection being configured to divide fuel into multiple times in one combustion cycle and inject the fuel, the single-stage injection being configured to inject fuel in one time in one combustion cycle. The control method supplies fuel vapor generated in a fuel tank as evaporated fuel to the internal combustion engine, and narrows an operating region in which the multiple-stage injection is performed when an amount of the evaporated fuel supplied to the internal combustion engine excesses a predetermined threshold, compared with a case where the amount of the evaporated fuel does not excess.

DESCRIPTION OF EMBODIMENTS

The following describes embodiments of the present invention with reference to the attached drawings.

First Embodiment

Figure 1:
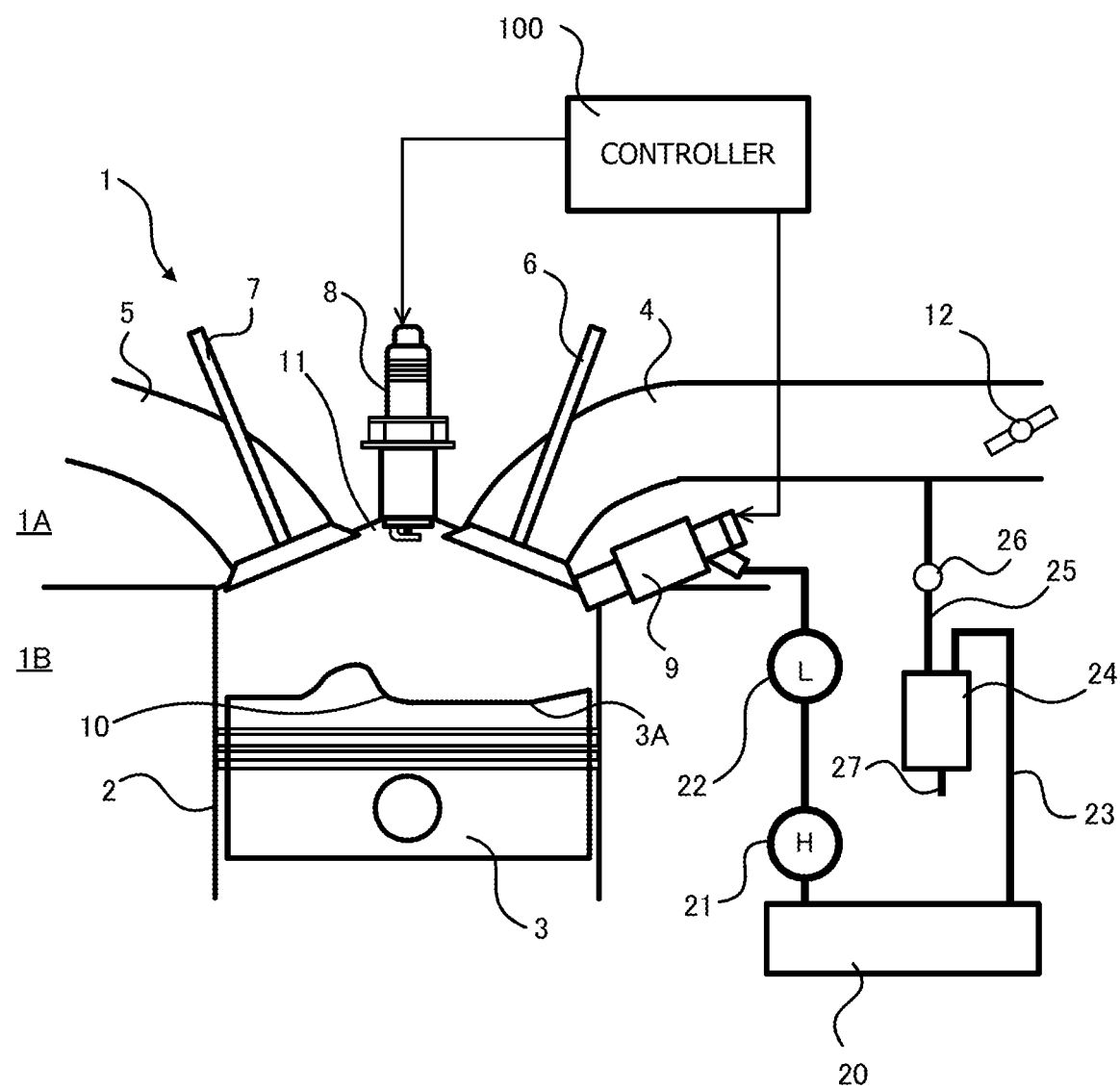
FIG. 1 is a schematic configuration diagram of a direct-injection internal combustion engine.

FIG. 1 is a schematic configuration diagram of a direct-injection internal combustion engine (hereinafter also referred to as "an engine") 1 to which this embodiment is applied. It should be noted that while FIG. 1 illustrates one cylinder, this embodiment is also applicable to a multicylinder engine.

A cylinder block 1B in the engine 1 includes a cylinder 2. The cylinder 2 reciprocatably houses a piston 3. The piston 3 is coupled to a crankshaft (not illustrated) and reciprocates by rotation of the crankshaft.

A cylinder head 1A in the engine 1 includes a concave combustion chamber 11. The combustion chamber 11 is configured into a so-called pent roof type. A pair of intake valves 6 are disposed on an inclined surface on an air intake side and a pair of exhaust valves 7 are disposed on an inclined surface of an exhaust air side. An ignition plug 8 is disposed at an approximately center position on the combustion chamber 11 surrounded by these pairs of intake valves 6 and exhaust valves 7 along an axis line of the cylinder 2.

A fuel injection valve 9 is disposed facing the combustion chamber 11 at a position interposed between the pair of intake valves 6 on the cylinder head 1A. The fuel is supplied from a fuel tank 20 to the fuel injection valve 9 via a low-pressure fuel pump 21 and a high-pressure fuel pump 22.

An exhaust gas purifying catalyst to purify exhaust gas of the engine 1 is interposed at a downstream of an exhaust flow in an exhaust passage 5. The exhaust gas purifying catalyst is, for example, a three-way catalyst.

The engine 1 includes a canister 24 to process vaporized fuel generated in the fuel tank 20. The canister 24 is coupled to the fuel tank 20 via a vapor passage 23 and is coupled to an intake passage 4, which is at downstream with respect to a throttle valve 12, via a purge passage 25. To the purge passage 25, a purge valve 26 to adjust a flow passage area of the purge passage 25 is interposed. The canister 24 is communicated with the atmosphere via an atmosphere passage 27.

The vaporized fuel generated in the fuel tank 20 passes through the vapor passage 23 and flows in the canister 24 to suction activated carbon in the canister 24. When the purge valve 26 is open and the air is introduced from the atmosphere passage 27 to the canister 24 by an intake negative pressure, the vaporized fuel suctioned to the activated carbon separates from the activated carbon. The separated vaporized fuel flows in the cylinder 2 together with the intake air flowing through the intake passage 4, and a combustion treatment (hereinafter this process is referred to as a purge process) is performed on the vaporized fuel. A controller 100, which will be described later, controls the opening and closing of the purge valve 26.

The controller 100 controls, for example, an amount of fuel injection, a fuel injection timing, and an ignition timing of the engine 1 according to an operating state of the engine 1. To perform these controls, the engine 1 includes various detecting devices such as a crankshaft angle sensor, a cooling water temperature sensor, and an air flow meter to detect an amount of air intake. It should be noted that the controller 100 is constituted of a microcomputer including a central processing unit (CPU), a read-only memory (ROM), a random access memory (RAM), and an input/output interface (I/O interface). The controller 100 can be constituted of a plurality of microcomputers.

The three-way catalyst provides the maximum purification performance with the exhaust gas at a stoichiometric air-fuel ratio. Therefore, the controller 100 performs a so-called air-fuel ratio feedback control that performs a feedback control on the amount of fuel injection such that the air-fuel ratio of the exhaust gas becomes close to the stoichiometric air-fuel ratio.

The controller 100 sets a target purge ratio for the purge process and performs the open/close controls on the purge valve 26 so as to achieve the target purge ratio. It should be noted that the purge ratio is a ratio of a purge flow rate to an intake air flow rate. The purge flow rate is a flow rate of purge gas (the vaporized fuel and the air) flown from the purge passage 25 to the intake passage 4. The target purge ratio is set in a range in which combustion stability and exhaust emission of the engine 1 are not deteriorated.

Since the fuel and air in the purge gas are supplied to the engine 1 during the purge process, the controller 100 corrects the amount of fuel injection according to the purge ratio to reduce the air-fuel ratio variation of the engine 1.

In view of this, the controller 100 estimates an amount of separated fuel from the canister 24 to calculate a purge amount correction coefficient FHOS on the basis of this amount of separated fuel, the target purge ratio, and an intake air mass. A request injection pulse width Tp settled on the basis of an operating state is corrected by the purge amount correction coefficient FHOS. The amount of separated fuel is estimated by the known method. For example, as disclosed in JP2007-309122, a fuel amount Y suctioned to the canister 24 and an activated carbon temperature T are calculated, and an amount of separation according to a purge flow rate is estimated on the basis of these values through operation.

Thus, the purge amount correction coefficient FHOS compensates an influence on the exhaust air-fuel ratio by the purge process, and an air-fuel ratio feedback correction coefficient α moves in the same manner as in the case without the purge. Accordingly, it is unnecessary for the air-fuel ratio feedback correction coefficient α to consider the influence from the disturbance caused by the purge.

With the direct injection engine 1, lowering an amount of attached fuel to the piston 3 and a combustion chamber wall surface is preferable from the aspect of reducing a Particulate Number (PN) and preventing dilution of oil by the fuel. There has been known as a method of lowering the amount of attached fuel to the piston 3 or the like, so-called multiple-stage injection, that divides the amount of fuel injection (a request injection pulse width Tp) in one combustion cycle into multiple times for injection.

The fuel injection valve 9 has the injection pulse width at the minimum (hereinafter referred to as the minimum pulse width) at which the stable control of the amount of fuel injection is possible. In view of this, with the multiple injection, the injection count in which the injection pulse width at each stage does not become smaller than the minimum injection pulse width needs to be set.

However, if a proportion assigned to the purge gas (hereinafter referred to as a purge sharing rate) in the total fuel amount supplied to the engine 1 increases due to the variation of the purge amount correction coefficient FHOS, the fuel amount injected from the fuel injection valve 9 decreases by the amount, possibly causing the injection pulse width at each stage below the minimum pulse width.

Therefore, this embodiment prevents the injection pulse width from falling below the minimum injection pulse width by the control described below.

Figure 2:
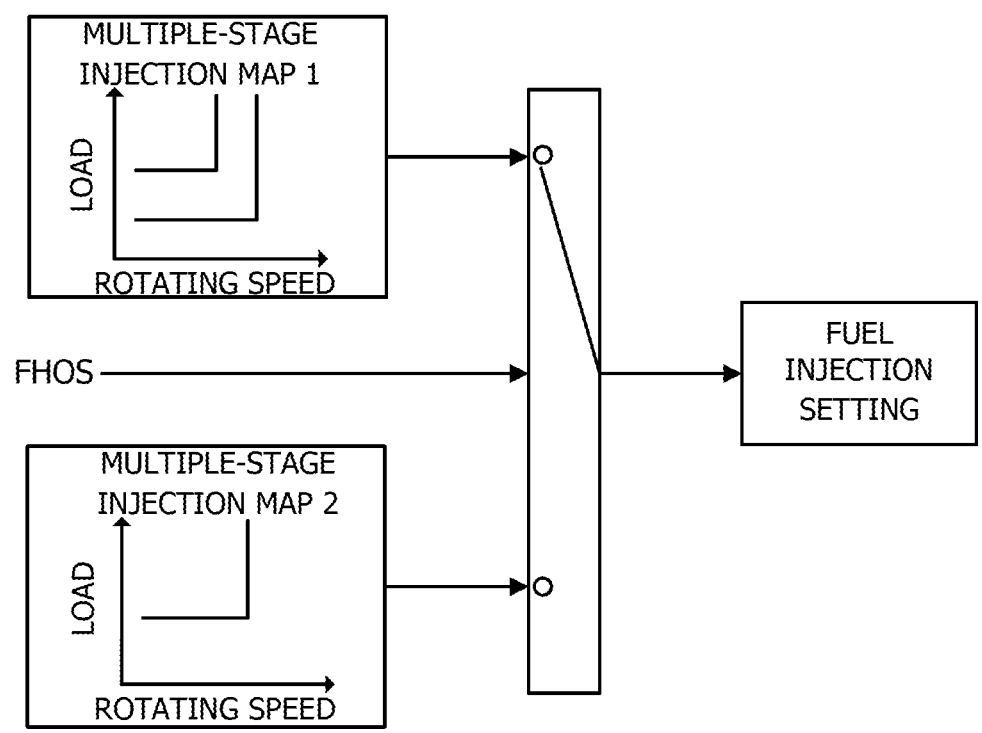
FIG. 2 is a block diagram of a multiple-stage injection control.

FIG. 2 is a block diagram describing a multiple injection control in this embodiment.

In this embodiment, two multiple-stage injection maps are preliminary provided, in which maps the counts of injections are set according to the operating state settled by a load and a rotating speed of the engine 1, and any one of the maps is selected according to the purge amount correction coefficient FHOS. An injection timing for each injection is set on the basis of the selected map.

Figure 3:
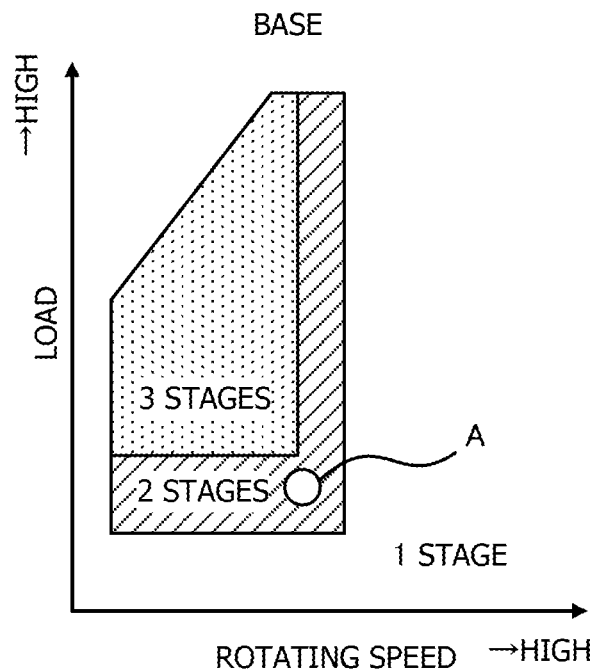
FIG. 3 is one example of a multiple-stage injection map.
Figure 4:
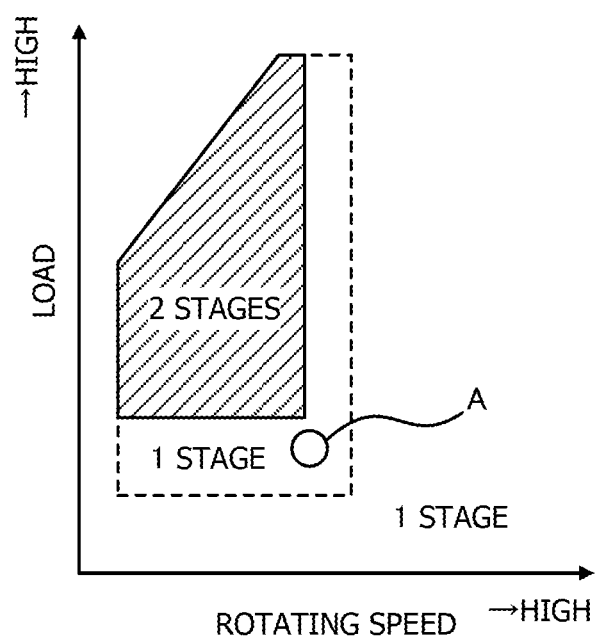
FIG. 4 is an example of the multiple-stage injection map when a multiple-stage injection region is narrowed.

FIG. 3 illustrates one example of a multiple-stage injection map 1 in FIG. 2. FIG. 4 illustrates one example of a multiple-stage injection map 2 in FIG. 2. It should be noted that points A in FIG. 3 and FIG. 4 will be described later. It should be noted that the dashed line in FIG. 4 indicates a two-stage injection region in FIG. 3.

The multiple-stage injection map 1 in FIG. 3 includes the two-stage injection region in which two-stage injection is performed at a low/middle rotating speed region of the engine 1. A region inside the two-stage injection region and of a low rotating speed and a high load is a three-stage injection region in which three-stage injection is performed. The other region is a single-stage (one-stage) injection region.

Meanwhile, in the multiple-stage injection map 2 in FIG. 4, the region equivalent to the two-stage injection region in the multiple-stage injection map 1 is a one-stage injection region and the region equivalent to the three-stage injection region in the multiple injection map 1 is the two-stage injection region. Accordingly, when the multiple-stage injection map 1 is switched to the multiple-stage injection map 2 with an operating point of the engine 1 in the three-stage injection region of the multiple-stage injection map 1, the injection count changes from the three stages to the two stages.

Thus, changing the injection count from the three stages to the two stages with the identical engine operating state lowers the injection count with the amount of fuel injection in one combustion cycle intact, thereby increasing the injection pulse width at each injection. Accordingly, with the three-stage injection, even when the injection pulse width at each stage falls below the minimum pulse width, switching the injection to the two-stage injection allows the injection pulse width at each stage to be larger than the minimum pulse width.

Figure 5:
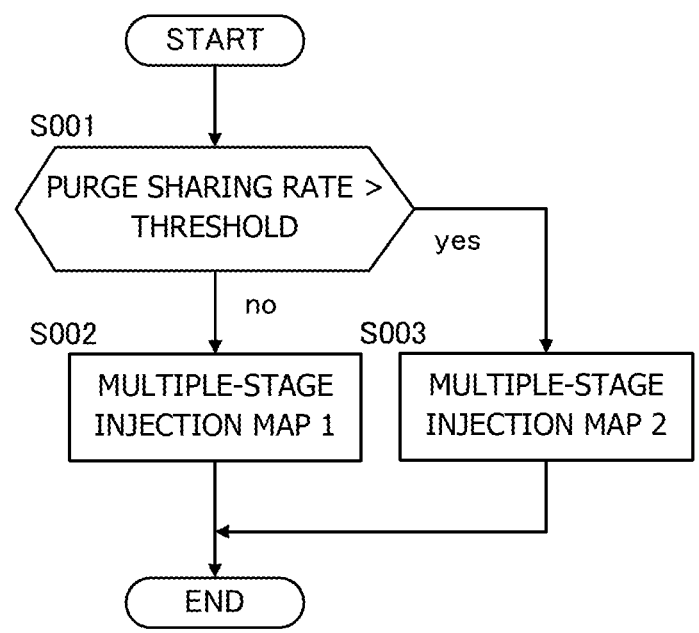
FIG. 5 is a flowchart of the multiple-stage injection control according to a first embodiment.

FIG. 5 is a flowchart illustrating a specific control routine for the multiple-stage injection control.

At Step S001, the controller 100 determines whether the purge sharing rate is larger than a predetermined threshold or not. The threshold has a magnitude ½ of the upper limit value of the purge sharing rate.

It should be noted that this embodiment performs a feedforward control on the purge sharing rate on the basis of, for example, the above-described estimated value of the amount of separated fuel. This ensures the control such that the injection pulse width does not fall below the minimum pulse width. Since the injection counts are preliminary mapped, quick handling is possible when the purge sharing rate suddenly changes compared with the case where the injection counts are set each time through operation.

It should be noted that the upper limit value of the purge sharing rate is set considering the following. The upper limit value is achievable with the size of the purge valve 26 and the injection pulse width does not fall below the minimum pulse width with the single-stage injection.

With the purge sharing rate equal to or smaller than the threshold, the controller 100 selects the multiple-stage injection map 1 at Step S002. On the other hand, with the purge sharing rate larger than the threshold, the controller 100 selects the multiple-stage injection map 2 at Step S003.

It should be noted that, the determination at Step S001 may use the purge amount correction coefficient FHOS instead of the purge sharing rate.

Figure 6:
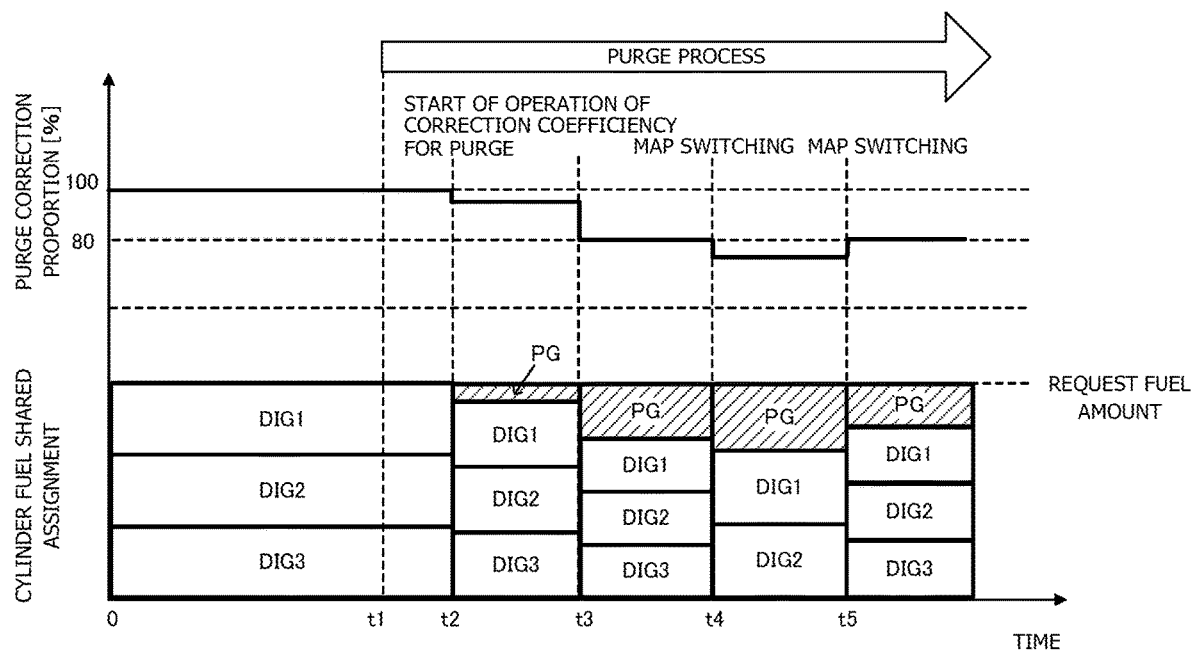
FIG. 6 is a timing chart when the multiple-stage injection control is performed.

FIG. 6 is a timing chart in the case where the control is performed.

The purge correction proportion in the drawing is a correction proportion by the purge amount correction coefficient FHOS. That is, the purge correction proportion of 100% means that the amount of injection of the fuel injection valve 9 remains to be the request injection amount, and the purge sharing rate is 0%. The purge correction proportion of 80% means that the amount of injection of the fuel injection valve 9 decreases to 80% of the request injection amount, and the purge sharing rate is 20%.

DIG1 to DIG3 in the drawing mean the respective injection stages in the three-stage injection. The length in the vertical axis direction means the amount of injection at each injection stage. PGs in the drawing mean the amount of vaporized fuel in the purge gas supplied to the engine 1 by the purge process.

The purge process starts at a timing t1, and the operation of the purge amount correction coefficient FHOS starts at a timing t2. Accordingly, in association with the introduction of the vaporized fuel, each injection pulse width of DIG1 to 3 becomes shorter than that before the timing t2. When the purge correction proportion becomes 80% at a timing t3, each injection pulse width of DIG1 to 3 becomes even shorter. The injection pulse width at this time is referred to as a minimum injection pulse width.

When the purge correction proportion falls below 80% at a timing t4, that is, the purge sharing rate exceeds the threshold (20%), the controller 100 switches the map from the multiple-stage injection map 1 to the multiple-stage injection map 2, and the injection enters the two-stage injection constituted of DIG1 and DIG2. Accordingly, in spite of the increase in the purge sharing rate, the injection pulse widths of DIG1 and DIG2 become longer than those in the three-stage injection. That is, although continuing the three-stage injection at and after the timing t4 results in the injection pulse width falling below the minimum injection pulse width, the switching to the two-stage injection maintains the injection pulse width larger than the minimum injection pulse width while increasing the purge sharing rate.

When the purge correction proportion exceeds 80% at a timing t5, the controller 100 switches the map to the multiple-stage injection map 1 again to perform the three-stage injection.

It should be noted that, to secure the stability or similar performance of the control, a hysteresis may be provided to a threshold to determine whether to return the two-stage injection to the three-stage injection or not. For example, even when the purge correction proportion changes from 75% to 80%, the two-stage injection may be maintained and the two-stage injection may be returned to the three-stage injection at the excess of 85%.

Figure 7:
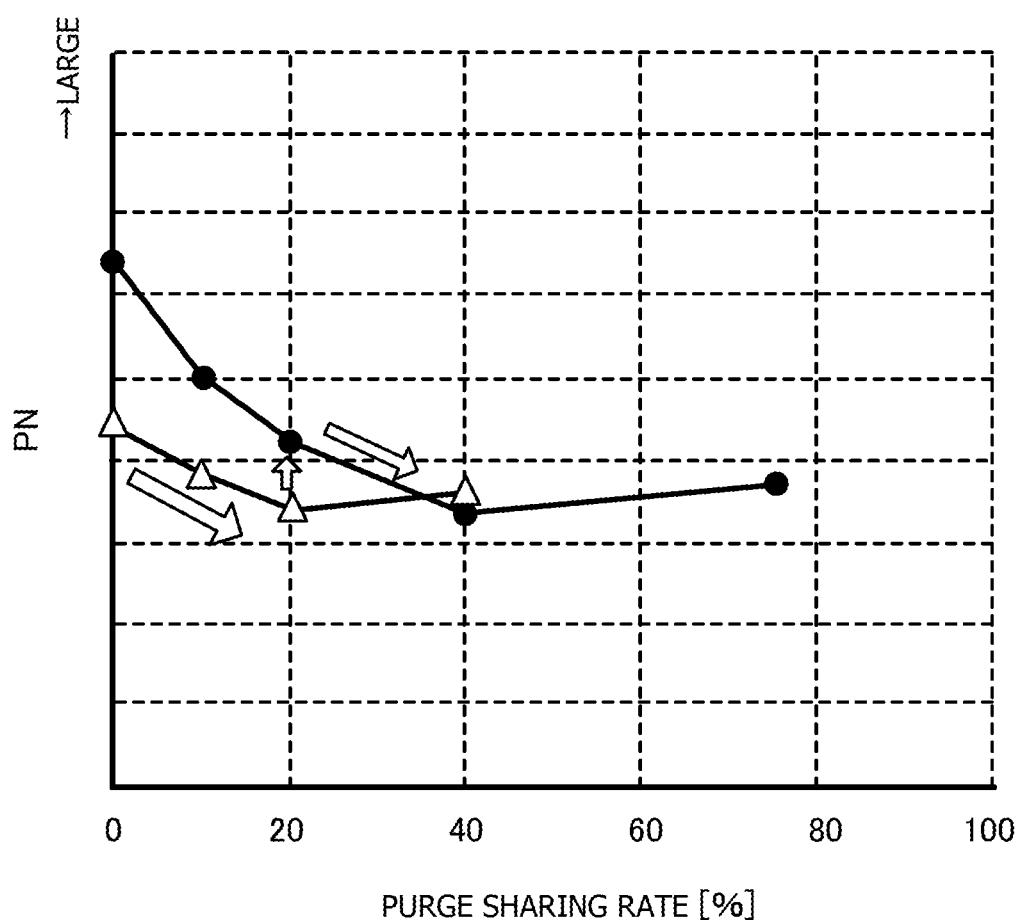
FIG. 7 is a drawing illustrating a relationship between a purge sharing rate and PN.

FIG. 7 is a drawing representing the change in PN in the case where the operating point is positioned at a point A in FIG. 3 and FIG. 4. The vertical axis in FIG. 7 indicates PN and the horizontal axis indicates the purge sharing rate. It should be noted that PN indicates the count of particulates in exhaust air of 1 cc. The circle symbols in the drawing indicate the one-stage injection and the triangle symbols indicate the two-stage injection.

With the two-stage injection, the upper limit of the purge sharing rate is 40% and the threshold is 20%. From the purge sharing rate of 0% to 20%, PN decreases in association with the increase in purge ratio. This is brought by an effect caused by the introduction of the purge gas. That is, although it is necessary for the fuel to evaporate and diffuse and mix in the intake air for combustion, a period during which the fuel injected from the fuel injection valve 9 can diffuse and mix is limited, only from the injection until the ignition timing. In contrast to this, the fuel in the purge gas has already mixed with the air. Accordingly, as the purge sharing rate increases, the air-fuel mixture likely to be combusted is supplied to the engine 1 much, and consequently PN is reduced.

By the excess of the purge sharing rate of 20%, PN changes to increase. This is because, the excess of the purge sharing rate of 20% increases the degree of fuel injection variation; therefore, the adequate amount of fuel is not supplied in relation to the amount of air intake.

With the one-stage injection, similar to the case of the two-stage injection with the purge sharing rate from 0% to 20%, PN decreases as the purge ratio increases. Here, it should be noted that PN is larger than the case of the two-stage injection. This is because the amount of attached fuel in the combustion chamber increases in the one-stage injection compared with the two-stage injection.

With the one-stage injection, PN continues decreasing even if the purge sharing rate exceeds 20%. This is because, since the injection count is small, the purge sharing rate at which the degree of variation in the fuel injection amount exceeds the limit becomes higher than that of the two-stage injection. When the purge sharing rate exceeds 40%, the degree of variation in the fuel injection amount also increases in the one-stage injection as well, PN changes to increase.

The execution of the control routine of this embodiment positions the point A in FIG. 3 and FIG. 4 in the region of the two-stage injection with the purge sharing rate from 0% to 20%, and in the region of the one-stage injection with the purge sharing rate exceeding 20%. That is, as indicated by the arrows in the drawing, history of PN in association with the increase in the purge sharing rate traces the history of the two-stage injection with the purge sharing rate from 0% to 20%, and traces the history of the one-stage injection with the purge sharing rate exceeding 20%. Accordingly, the control of this embodiment can reduce the increase in PN caused by reducing the injection count.

Figure 8:
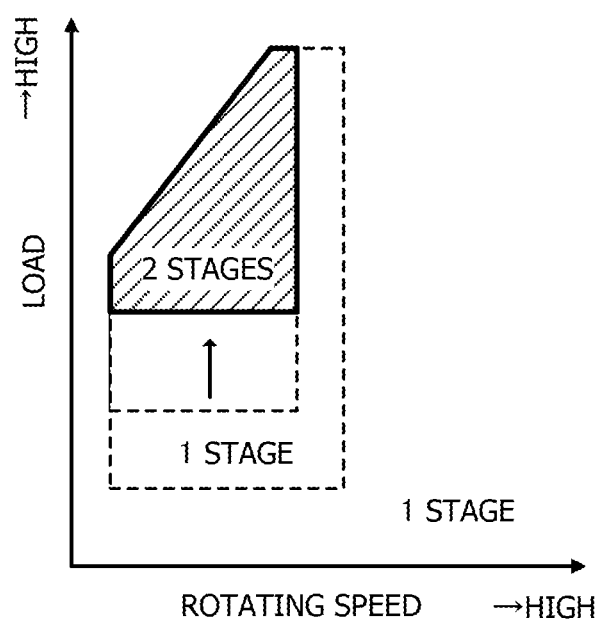
FIG. 8 is a modification of the multiple-stage injection map when the multiple-stage injection region is narrowed.
Figure 9:
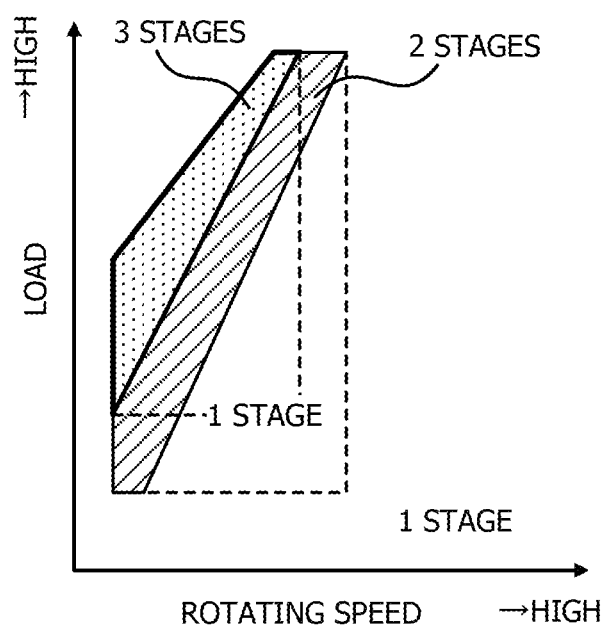
FIG. 9 is another modification of the multiple-stage injection map when the multiple-state injection region is narrowed.

It should be noted that the multiple-stage injection map 2 is not limited to one illustrated in FIG. 4. FIG. 8 and FIG. 9 illustrate other examples of the multiple-stage injection map 2. The dashed lines in FIG. 8 and FIG. 9 each represent the two-stage injection region and the three-stage injection region in FIG. 3.

In FIG. 4, the two-stage injection region in the multiple-stage injection map 1 in FIG. 3 is equivalent to the one-stage injection region and the three-stage injection region in the multiple injection map 1 is equivalent to the two-stage injection region. In contrast to this, in FIG. 8, not only the three-stage injection region in FIG. 3 changes to the two-stage injection region but also the two-stage injection region is reduced in size to the high load side compared with the three-stage injection region in FIG. 3. In FIG. 9, the two-stage injection region and the three-stage injection region are each reduced in size to the low rotation/high load sides compared with the two-stage injection region and the three-stage injection region in FIG. 3. That is, in this embodiment, it can be said that any switching from FIG. 3 to FIG. 4, FIG. 8, or FIG. 9 narrows the operating region in which the multiple-stage injection is performed.

As described above, this embodiment switches the count of injections of multiple-stage injection, which divides the injected fuel in one combustion cycle into multiple times, according to the operating region for execution. This embodiment supplies the fuel vapor generated in the fuel tank to the engine 1 as the evaporated fuel. When the amount of evaporated fuel supplied to the engine 1 is much, the operating region with the large injection count of the multiple-stage injection is configured to be narrow compared with the case where the amount of evaporated fuel is not much. It should be noted that "the amount of evaporated fuel is much" means a relatively large amount state like, for example, the amount of evaporated fuel exceeds a predetermined threshold. Additionally, "the large injection count of the multiple injection" means the relatively large injection count among the set counts of injections. In this embodiment, the injection count decreases according to the increase in the purge sharing rate, and the injection pulse width at each injection increases. This ensures preventing each injection pulse width in the multiple-stage injection from falling below the minimum injection pulse width. Consequently, the fuel can be stably supplied without restricting the amount of purge.

This embodiment divides the operating region into the plurality of regions of the different counts of injections. Reducing the respective counts of injections of the plurality of regions narrows the operating region with the large injection count of the multiple-stage injection. Thus setting the injection counts of the multiple-stage injections to each operating region allows stably supplying the fuel even if the amount of purge (the purge sharing rate) suddenly changes.

In this embodiment, the sizes of the plurality of respective regions with the counts of injections set may be reduced in order to narrow the operating region in which the injection count of the multiple-stage injection is large. In this case as well, the fuel can be stably supplied even the case of sudden change in the amount of purge and without restricting the purge ratio similar to the above-described case.

In this embodiment, the threshold as the determination criterion for whether the amount of evaporated fuel is large or not is the amount of purge (the amount of evaporated fuel) at which the injection pulse width of each injection after the amount of fuel injection is corrected according to the amount of purge (the amount of evaporated fuel) without changing the injection count of the multiple-stage injection becomes the minimum injection pulse width. Accordingly, even if the amount of purge (the purge sharing rate) increases, the injection pulse width does not fall below the minimum injection pulse width.

It should be noted that while, in the above-mentioned embodiment, the case is described in which the operating region is divided into the regions with the single-stage injection set to be performed and with the multiple-stage injection set to be performed as illustrated in FIG. 3, this should not be construed in a limiting sense. For example, the control of this embodiment is applicable to the case of the minimum injection count being two stages, that is, the region of the single-stage injection in FIG. 3 becomes the region of the two-stage injection, similarly the region of the two-stage injection becomes the region of the three-stage injection, and similarly the region of the three-stage injection becomes the region of a four-stage injection.

Second Embodiment

With the first embodiment, the plurality of multiple-stage injection maps are preliminary created and the controller 100 switches these maps to change the injection count. In contrast to this, the second embodiment differs from the first embodiment in that the controller 100 sets the injection count through operation.

Figure 10:
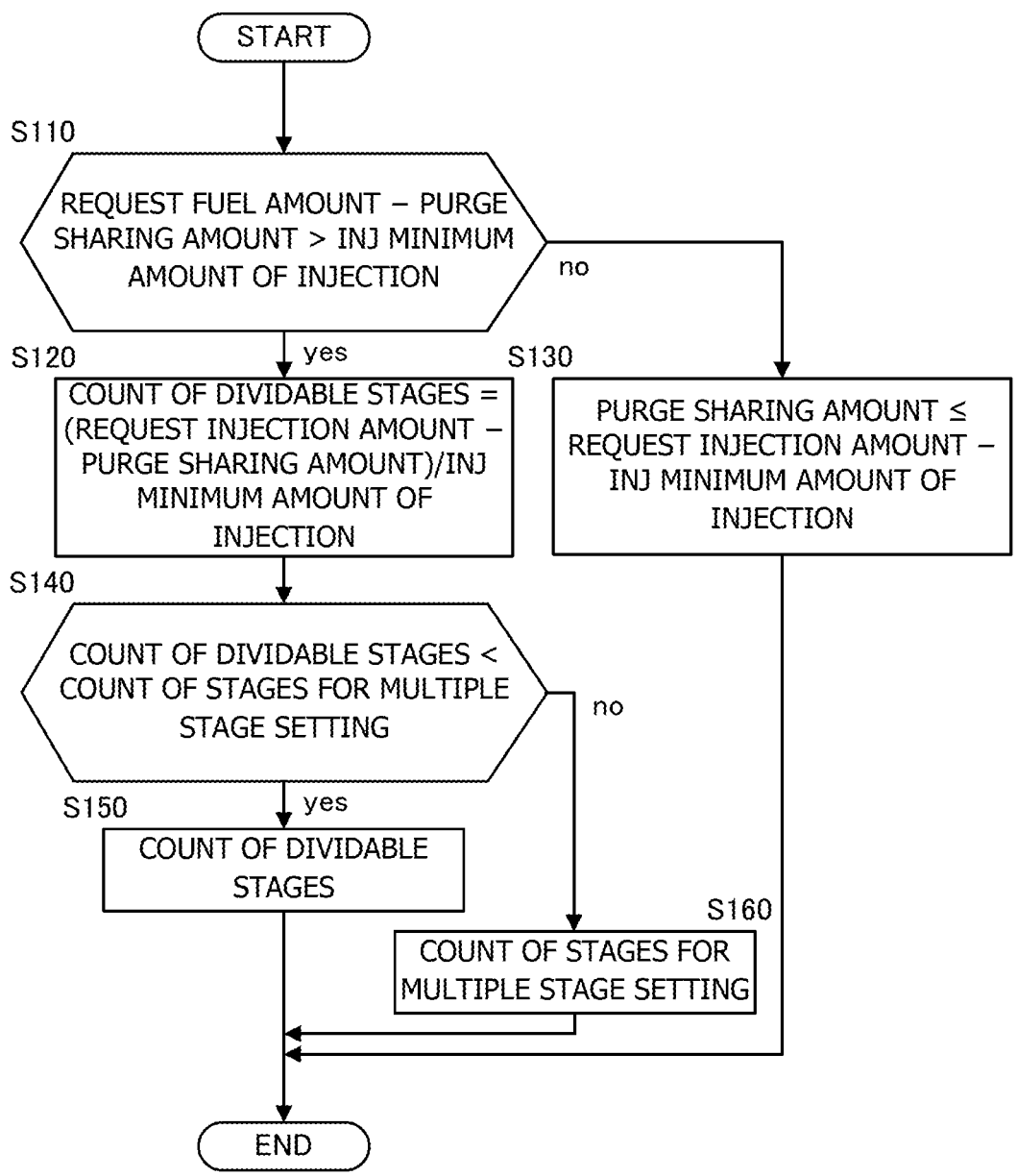
FIG. 10 is a flowchart of the multiple-stage injection control according to a second embodiment.

FIG. 10 is a flowchart illustrating a control routine for the multiple-stage injection control of the second embodiment. The following gives the description following the steps.

At Step S110, the controller 100 determines whether a value found by subtracting the fuel amount assigned to the purge gas (an purge sharing amount) from the amount of requested fuel is more than the minimum amount of injection of the fuel injection valve 9 or not. The amount of requested fuel is the fuel amount required for combustion in the cylinder settled according to the engine operating state of the engine 1, and is, for example, the fuel amount becoming the stoichiometric air-fuel ratio relative to the amount of air intake. The purge sharing rate is calculated on the basis of the above-described purge sharing rate. The minimum amount of injection of the fuel injection valve 9 is fixed using the minimum injection pulse width and a fuel injection pressure.

The above-described determination is performed to confirm whether the injection pulse width of the fuel injection valve 9 is larger than the minimum injection pulse width or not when the amount of fuel injection on which an amount reduction correction is performed according to the introduction of the purge gas is injected. With the determination result of yes, the controller 100 performs a process at Step S120 and with the determination result of no, the controller 100 performs a process at Step S130.

At Step S130, the controller 100 corrects the purge sharing amount such that the determination result at Step S110 becomes yes and terminates this routine. It should be noted that, since the general purge control sets the purge ratio considering the minimum injection pulse width, the determination result at Step S110 does not become no. Accordingly, this routine may omit Steps S110 and S130.

At Step S120, the controller 100 operates a count of dividable stages. Specifically, the controller 100 sets a value as the count of dividable stages, which can be found by dividing a value found by subtracting the purge sharing amount from a cylinder-request amount of injection by the minimum injection pulse width of the fuel injection valve 9. It should be noted that in the case where the result of the operation includes a decimal place, the decimal place is truncated and the integer part is set as the count of dividable stages.

At Step S140, the controller 100 determines whether the count of dividable stages is smaller than the count of stages for multiple-stage setting or not. The count of stages for multiple-stage setting is the number of times close to and smaller than the upper limit value of the injection count achievable by the fuel injection system used in this embodiment. The reason that the upper limit value is not set as the count of stages for multiple-stage setting is as follows. As the value closes to the upper limit value, stably supplying the fuel becomes difficult; therefore, the margin is provided from the aspect of stability of the amount of supplied fuel.

With the determination result of yes, the controller 100 performs a process at Step S150, with determination result of no, the controller 100 performs a process at Step S160.

At Step S150, the controller 100 sets the count of dividable stages calculated at Step S120 as the injection count at this time.

At Step S160, the controller 100 sets the count of stages for multiple-stage setting as the injection count at this time.

As described above, this embodiment sets the injection count through the operation whenever the control routine is performed. In the operation at Step S120, as the purge sharing amount increases, the count of dividable stages becomes small. When the count of dividable stages calculated according to the purge sharing amount becomes smaller than the preset count of stages for multiple-stage setting, the count of dividable stages is employed as the injection count.

That is, similar to the first embodiment, in this embodiment, the threshold is actually present for the amount of evaporated fuel supplied to the engine 1. When the amount of evaporated fuel exceeds the threshold, the count of the multiple-stage injection decreases compared with the case where the amount of evaporated fuel does not exceed the threshold. That is, when the amount of evaporated fuel exceeds the threshold, an operating region in which the multiple-stage injection is performed becomes narrow.

Consequently, similar to the first embodiment, the fuel can be stably supplied without restricting the amount of purge.

Third Embodiment

Figure 11:
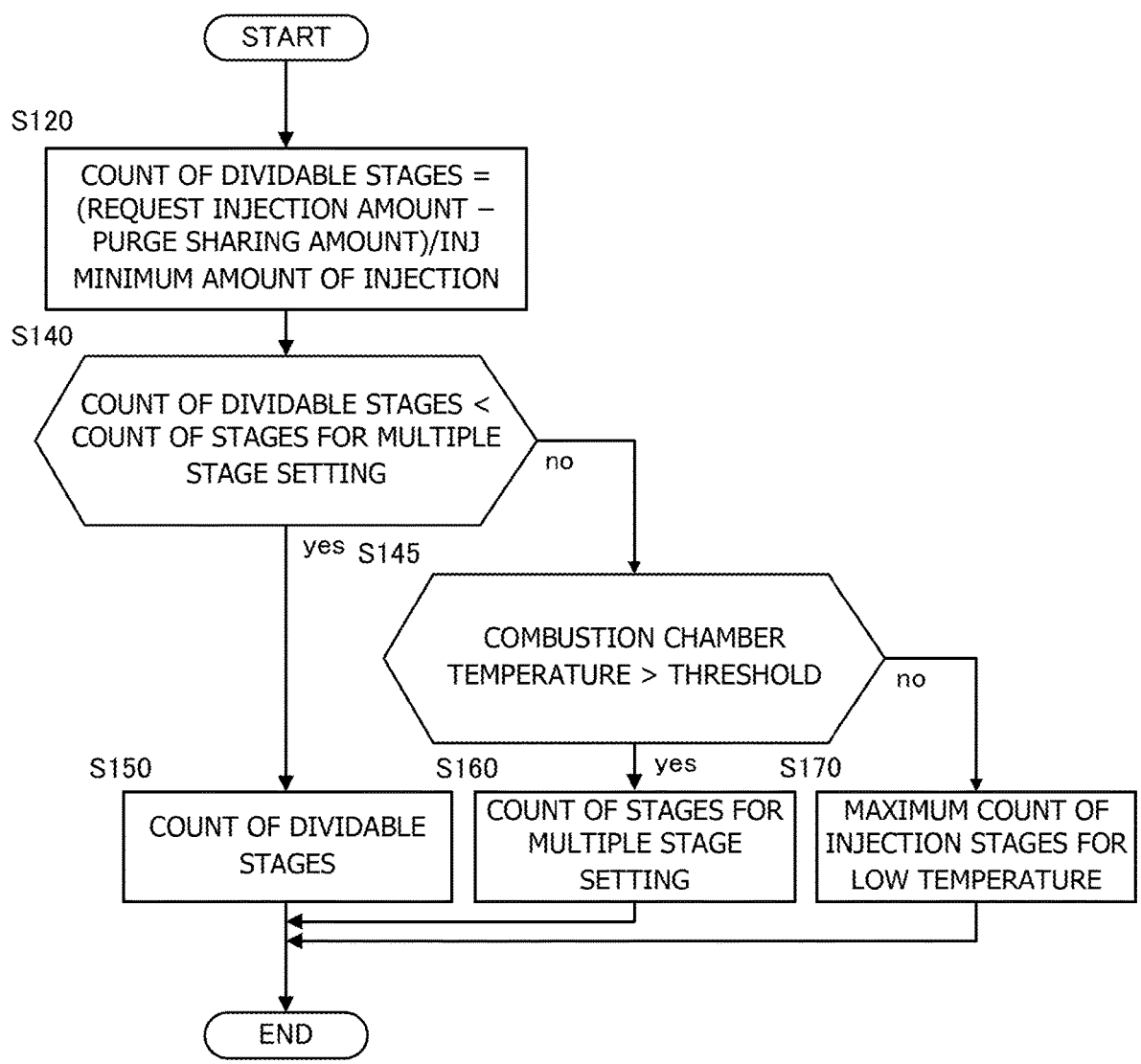
FIG. 11 is a flowchart of the multiple-stage injection control according to a third embodiment.

FIG. 11 is a flowchart illustrating the control routine for the multiple-stage injection control in the third embodiment. Step numbers identical to FIG. 10 are assigned to steps performing processes similar to steps in FIG. 10.

The multiple-stage injection control of this embodiment differs from the control of the second embodiment in that the determination on a combustion chamber temperature (especially a temperature at a piston top surface) is performed (Step S145) and the injection count with the case of the combustion chamber temperature being lower than a threshold is set (Step S170). It should be noted that the control of this embodiment omits the steps equivalent to the Step S110 and Step S130 in FIG. 10. The following mainly describes Step S145 and Step S170.

When the controller 100 determines that the count of dividable stages is equal to or more than the count of stages for multiple-stage setting at Step S140, the controller 100 determines whether the combustion chamber temperature is higher than the preset threshold or not at Step S145. This determination deter mines whether the inside of the combustion chamber is in a so-called low-temperature state or not.

As, the combustion chamber temperature, for example, the piston top surface temperature is used. The piston top surface temperature may be directly measured or may be estimated by operation on the basis of, for example, a cooling water temperature and an engine operating period.

The threshold used for the determination is a threshold whether to cause the increase in PN or not. Specifically, on the basis of a relationship between the amount of attached fuel to the piston 3 and the piston top surface temperature and a relationship between the amount of attached fuel and PN obtained through, for example, experiments, the lower limit of the piston top surface temperature not causing the increase in PN is set as the threshold.

It should be noted that, instead of the piston temperature, an estimated value of a cylinder wall surface temperature may be used.

With the determination result of yes at Step S145, the controller 100 performs a process similar to Step S160 in FIG. 10.

With determination result of no at Step S145, the controller 100 performs a process at Step S170.

At Step S170, the controller 100 sets the maximum count of injection stages for low-temperature state as the injection count. The maximum count of injection stages for low-temperature state is the number of times smaller than the injection count achievable with the fuel injection system used in this embodiment and larger than the count of stages for multiple-stage setting used at Step S140. That is, with the low piston top surface temperature, this embodiment takes precedence the reduction in the amount of attached fuel to the piston top surface due to the increase in the injection count over the stability of the amount of supplied fuel.

As described above, in this embodiment, with the combustion chamber temperature (piston top surface temperature) in the low-temperature state lower than the predetermined threshold, the count of the multiple-stage injection in the operating region in which the multiple-stage injection is performed is increased, compared with the case of the combustion chamber temperature being equal to or higher than the threshold. Accordingly, with the combustion chamber temperature at the low temperature, the injection count increases and the increase in amount of attached fuel to the piston top surface can be reduced. Accordingly, according to this embodiment, in addition to the operational advantages similar to the second embodiment, the increase in PN can be further reduced at the low temperature start of the engine 1 and recovery from idling stop.

Figure 12:
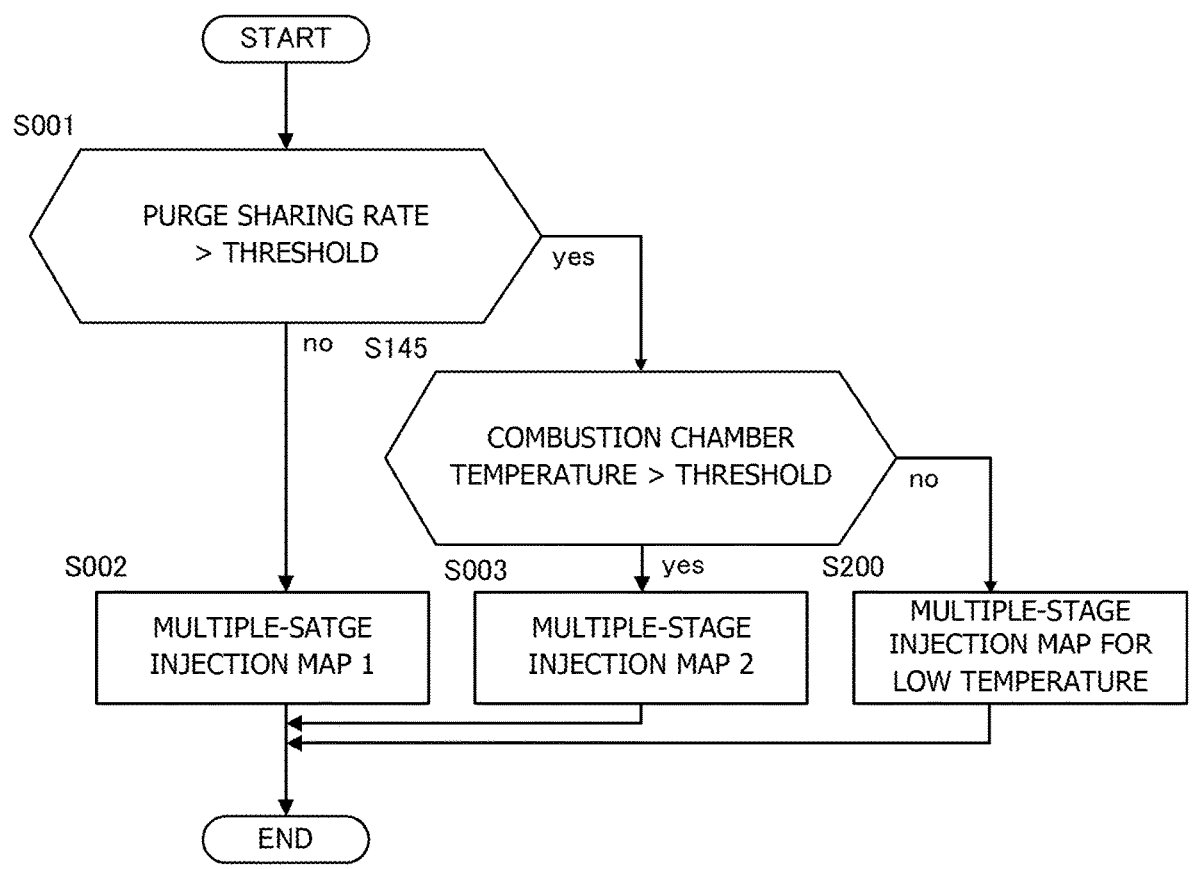
FIG. 12 is another example of the flowchart of the multiple-stage injection control according to the third embodiment.

It should be noted that it is obvious that the present invention is not limited to the above-described embodiments, and various modifications are possible within the scope of the technical idea described in CLAIMS. For example, the control for low-temperature state described in the third embodiment may be combined with the control to switch the multiple-stage injection maps described in the first embodiment. In this case, a multiple-stage injection map for low-temperature state may be preliminary created. As illustrated in FIG. 12, the controller 100 conducts determination on whether the combustion chamber temperature is a low temperature or not when the purge sharing rate exceeds the threshold (S145), and selects the multiple-stage injection map for low-temperature state at the low temperature (S200).

The embodiments of the present invention has been explained thus far. However, the above-described embodiments are only a part of application examples of the present invention, and is not intended to limit the technical scope of the present invention to the concrete structure of the above-described embodiments.

The invention claimed is:

1. A control method of a direct-injection internal combustion engine configured to perform, in accordance with an operating state of the internal combustion engine, a multiple-stage injection in which fuel injection is performed in multiple times stages in one combustion cycle in a predetermined operating region, wherein the internal combustion engine comprises an evaporated fuel processing device configured to supply fuel vapor generated in a fuel tank to the internal combustion engine, the method comprising:

determining if the internal combustion engine operates in the predetermined operating region;

calculating a required fuel amount by the internal combustion engine in accordance with the operating state of the internal combustion engine;

estimating an amount of fuel supplied by the evaporated fuel processing device to the internal combustion engine in a form of the fuel vapor in accordance with an operating state of the evaporated fuel processing device;

calculating a fuel injection amount by subtracting the amount of the fuel supplied by the evaporated fuel processing device to the internal combustion engine from the required fuel amount; and when the internal combustion engine operates in the predetermined operating region, dividing the fuel injection amount by a stage number of the multiple stages to obtain a divided fuel injection amount, and performing the multiple-stage injection with the divided fuel injection amount, wherein, the method further comprises:

determining if the divided fuel injection amount falls below a minimum injection amount; and when the divided fuel injection amount falls below the minimum injection amount, reducing the stage number of the multiple stages to prevent the divided fuel injection amount from falling below the minimum injection amount.

2. A control device of a direct-injection internal combustion engine configured to perform, in accordance with an operating state of the internal combustion engine, a multiple-stage injection in which fuel injection is divided into multiple stages in one combustion cycle in a predetermined operating region, wherein the internal combustion engine comprises an evaporated fuel processing device configured to supply fuel vapor generated in a fuel tank to the internal combustion engine, the device comprising:

a sensor configured to detect the operating state of the internal combustion engine;

a sensor configured to detect an operating state of the evaporated fuel processing device; and a control unit configured to:

determine if the internal combustion engine operates in the predetermined operating region;

calculate a required fuel amount by the internal combustion engine in accordance with the operating state of the internal combustion engine;

estimate an amount of fuel supplied by the evaporated fuel processing device to the internal combustion engine in a form of the fuel vapor in accordance with the operating state of the evaporated fuel processing device;

calculate a fuel injection amount by subtracting the amount of the fuel supplied by the evaporated fuel processing device to the internal combustion engine from the required fuel amount; and when the internal combustion engine operates in the predetermined operating region, divide the fuel injection amount by a stage number of the multiple stages to obtain a divided fuel injection amount and perform the multiple-stage injection with the divided fuel injection amount, wherein the control unit is further configured to:

determine if the divided fuel injection amount falls below a minimum injection amount; and when the divided fuel injection amount falls below the minimum injection amount, reduce the stage number of the multiple stages to prevent the divided fuel injection amount from falling below the minimum injection amount.

3. The control method according to claim 1, wherein reducing the stage number of the multiple stages includes reducing the predetermined operating region in size.

4. The control method according to claim 1, wherein the internal combustion engine comprises a combustion chamber into which the fuel is injected, and the method further comprises:

increasing the stage number of the multiple stages in the predetermined operating region, when the divided fuel injection amount does not fall below the minimum injection amount and a temperature of the combustion chamber is lower than a predetermined temperature.

* * * * *